United States Patent [19]

Evans et al.

[11] 3,910,123

[45] Oct. 7, 1975

[54] APPARATUS FOR THE MEASUREMENT OF ANGULAR VELOCITY

[75] Inventors: John Evans, Oakland; Jay Hoffman, Livingston; Bart J. Zoltan, Emerson, all of N.J.

[73] Assignee: The Singer Company, Little Falls, N.J.

[22] Filed: Oct. 23, 1973

[21] Appl. No.: 408,313

[52] U.S. Cl. ........................... 73/516 LM; 73/517 A
[51] Int. Cl. ........................................... G01p 15/08
[58] Field of Search ....... 73/516 LM, 516 R, 517 R, 73/517 A, 517 B

[56] References Cited
UNITED STATES PATENTS

| | | | |
|---|---|---|---|
| 3,011,347 | 12/1961 | Boitnott | 73/517 R X |
| 3,105,385 | 10/1963 | Hughes | 73/517 B X |
| 3,110,185 | 11/1963 | Hughes | 73/517 R |
| 3,309,930 | 3/1967 | Jones | 73/516 LM |

*Primary Examiner*—James J. Gill
*Attorney, Agent, or Firm*—T. W. Kennedy

[57] ABSTRACT

Angular velocity measuring apparatus includes a conduit containing a radioactive gas, a first electrode maintained at an electrical potential for collecting electrodes from the gas, second and third electrodes disposed on respectively opposite sides of the first electrode and difference circuit means for indicating changes in ions incident on the second and third electrodes.

9 Claims, 4 Drawing Figures

APPARATUS FOR THE MEASUREMENT OF ANGULAR VELOCITY

FIELD OF THE INVENTION

This invention relates to apparatus for use in determining angular velocity.

BACKGROUND OF THE INVENTION

In recent efforts to simplify the nature of apparatus for use in determining angular velocity of an object, attention has centered on the desirability of eliminating complicated mechanism and circuitry involved in long-known devices. Typical of such long-known devices is the electromechanical rate gyroscope of the type having an electromagnetic rotor rotated at high speed to provide a reference element of requisite angular momentum conserving character. Such electromechanical gyroscopes have relatively high operating power demands and less than desirable life and reliability limits based on their incorporation of moving mechanical parts. In addition, typical applications for these devices, e.g., auto pilot damping, flight control and inertial guidance, require high resolution and hence demand high precision in manufacture with attendant increased production costs.

Among the types of apparatus developed in the efforts to simplify the electromechanical rate gyroscope are gyroscopes having electrostatically suspended rigid rotors and, more recently, as set forth in copending, commonly-assigned application Ser. No. 411,538, filed on Oct. 31, 1973, and entitled "Angular Velocity Measuring Apparatus," gyroscopes incorporating non-rigid rotor structure constituted by a gas set into motion by "seeding" the same with ionized molecules.

SUMMARY OF THE INVENTION

It is an object of the present invention to provide a reliable and relatively low cost apparatus for use in determining angular velocity.

It is a more particular object of the invention to provide still further angular velocity measuring apparatus of simplified construction not involving moving mechanical parts, incorporating non-rigid rotor means and having low operating power requirements.

In the efficient attainment of these and other objects, the invention provides a casing securable to an object under study and including a conduit containing a gas having electrically charged particles of first and second respectively opposite polarities, namely free electrons and positive ions. First and second electrode means are disposed in the conduit in spaced relation and a voltage supply is connected to the first electrode means to render the same operative to collect first polarity electrical charges in the vicinity thereof from said gas. Difference circuitry is connected to the second electrode means and provides an output signal indicative of second polarity electrical charges incident on the second electrode means.

In a particularly preferred embodiment, the invention contemplates the containment of a radioactive gas in the casing conduit, first electrodes disposed in the conduit and connected to a source of voltage of positive potential for removing electrons from the gas thereby creating highly ionized regions in the gas and second electrodes adjacent the first electrodes and connected to the difference circuitry. On movement of the casing, ions bombarding or otherwise incident on the second electrodes are in respective different amounts according with the ion population of the respective regions of the gas into which the second electrodes are moved.

The foregoing and other objects and features of the invention will be evident from the following detailed description of preferred embodiments thereof and from the drawings wherein like reference numerals identify like parts throughout.

DESCRIPTION OF THE PREFERRED EMBODIMENTS

Figure 1:
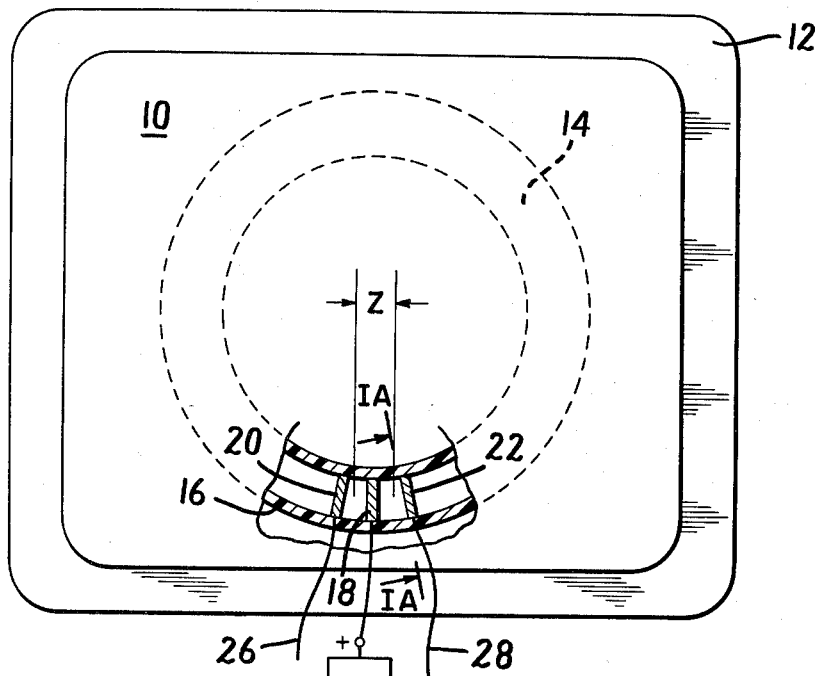
FIG. 1 is a plan view of a first embodiment of apparatus according with the invention, partly broken away to show detail.

Referring to FIG. 1, casing 10 is secured to an object 12, the angular velocity of which is to be measured. A conduit 14, preferably elongate and of the endless variety as shown, is supported interiorly of casing 10 in a plane parallel to the plane in which the angular motion of object 12 occurs. As shown in the broken away portion of FIG. 1, conduit 14 is preferably comprised of a wall 16 of non-conductive material.

Figure 1A:
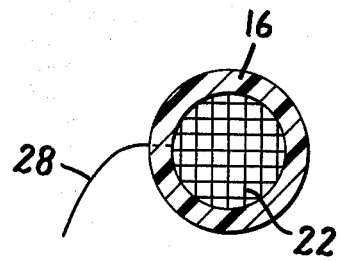
FIG. 1A is a cross-sectional view taken along line IA—IA of FIG. 1.

An ionized gas, e.g., radioactive krypton, tritium or the like, is introduced into conduit 14 and the conduit is thereupon sealed such that the gas is contained. As radio active decay occurs in the gas, energetic subatomic particles such as electrons or alpha particles are emitted. These particles pass through the surrounding gas and through frequency collisions ionize hundreds or thousands of gas atoms by removing outer shell electrons from these neutral atoms. This results in a mixture of free electrons and positive ions in the radioactive gas. Fixedly secured to wall 16 interiorly of conduit 14 are first electrode 18, second electrode 20 and third electrode 22. Second and third electrodes 20 and 22 are supported spacedly and longitudinally in the conduit and on respectively opposite sides of first electrode 18. Electrode 18 is connected to a source of positive voltage 24. Conductors (lines) 26 and 28 are connected respectively to electrodes 20 and 22. The electrodes are of screen- or mesh-like configuration as is shown for electrode 22 in FIG. 1A.

Under quiescent conditions, first electrode 18 functions to collect electrons in the vicinity thereof, thereby leaving the region rich in positive ions (zone Z in FIG. 1). On rotation of object 12, casing 10 is rotated relative to the gas contained in conduit 14, the contained gas remaining fixed in inertial space. Assuming clockwise rotation of the object, it will be seen that electrode 22 is displaced from its quiescent adjacent positional relation to region Z and enters the same. Electrode 20, on the other hand, withdraws from its quiescent adjacent positional relationship to region Z into a normally ionized region of the contained gas. Ions impinging on grids 20 and 22 give rise to currents in conductors 26 and 28, which are respectively different in amplitude by reason of the positioning of electrodes 20 and 22 in markedly different ionization zones.

Figure 2:
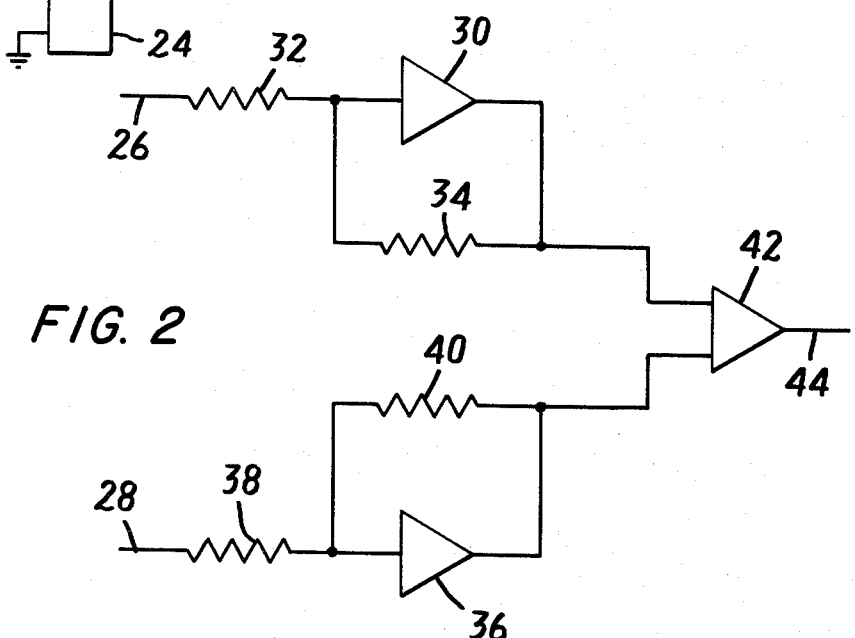
FIG. 2 illustrates circuitry for use with the FIG. 1 apparatus in providing signals indicative of angular velocity.

Any suitable difference circuit means connected to lines 26 and 28 may be employed in determining object angular velocity. As in the FIG. 2 showing of such circuit means, an amplifier 30 has an input resistor 32 connected to line 26 and a feedback resistor 34. An amplifier 36 has an input resistor 38 connected to line 28 and a feedback resistor 40. A differential amplifier 42 receives the outputs of amplifiers 30 and 36 and provides signals indicative of object angular velocity on its output line 44.

Figure 3:
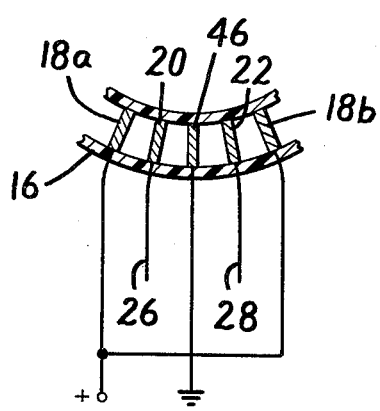
FIG. 3 illustrates a plan sectional view of a portion of a second embodiment of apparatus according with the invention.

Referring to FIG. 3, the particularly preferred embodiment of the invention involves the use of plural first electrodes 18a and 18b, each connected to the positive voltage provided by source 24, second electrodes 20 and 22 as in FIG. 1, each adjacent one of electrodes 18a and 18b, and a further electrode 46 intermediate electrodes 20 and 22 and connected to electrical ground potential. In this arrangement, plural highly ionized regions are created in the contained gas, respectively in the vicinity of electrodes 18a and 18b. Electrode 46 serves to isolate these regions from each other. Electrodes 20 and 22 are connected to the FIG. 2 circuitry or its equivalent as discussed above.

As will be clear from the FIG. 3 variation, regions of high ion population may be created in the contained gas in any desired multiplicity. Electrode combinations creating the multiplicity of zones are associated with ion-collecting electrodes and are in turn connected to circuitry for detecting differences in ion collection therebetween. As alluded to in the summary of the invention above, differences in electron collection may be examined to determine angular velocity as an alternate to ion collection examination, in which case the difference circuit means is associated with electrodes 18a and 18b and negative voltage supply means may be associated with electrodes 20 and 22.

The invention further contemplates the use of a simple pair of electrodes, one electrode collecting first polarity charges from the gas and the other electrode providing a measure of second polarity charges incident thereon. Changes in such measure may be examined as respects a reference level.

As will now be evident, various changes and modifications may be introduced in the particularly disclosed embodiments without departing from the scope of the invention. Accordingly, the particularly disclosed embodiments are intended in an illustrative and not in a limiting sense. The true spirit and scope of the invention is set forth in the following claims.

What is claimed is:

1. Apparatus for use in measuring the angular velocity of an object comprising:
   a. conduit means forming a closed loop secureable to said object for containing a gas;
   b. a gas in said conduit means having electrical charges of opposite polarities consisting of electrons and positive ions;
   c. first and second electrode means fixedly and spacedly disposed in said conduit means;
   d. first circuit means connected to said first electrode means for providing said first electrode means with an electrical potential whereby said first electrode means collect electrons from said gas; and
   e. second circuit means connected to said second electrode means and generating an output signal indicative of positive ions incidence of said second electrode means said electrical potential provided to said electrode means being of a polarity with respect to the electrical potential of said second electrode means.

2. The apparatus claimed in claim 1 wherein said gas is a radioactive gas.

3. The apparatus claimed in claim 1 wherein said second electrode means comprises first and second electrodes disposed on respectively opposite sides of said first electrode means and wherein said second circuit means comprises difference circuit means having first and second input terminals respectively connected to said first and second electrodes, and a further terminal providing said output signal.

4. The apparatus claimed in claim 1 including first and second pairs of said first and second electrode means, said first pair being spacedly displaced from said second pair, and third electrode means disposed in said conduit means between said first and second pairs and maintained at electrical ground potential.

5. Apparatus for use in measuring the angular velocity of an object comprising:
   a. conduit means forming a closed loop securable to said object for containing a gas;
   b. an ionized gas contained in said conduit means;
   c. voltage supply means providing an output voltage of polarity positive relative to electrical ground potential;
   d. first electrode means fixedly disposed in said conduit means and connected to said supply means for removing electrons from ionized gas located in the vicinity of said first electrode means;
   e. second and third electrode means fixedly disposed in said conduit means on respective opposite sides of said first electrode means for collecting ions incident thereon; and
   f. circuit means connected to said second and third electrode means for providing an output signal indicative of differences in respective ion collection thereby.

6. The apparatus claimed in claim 5 wherein said output signal providing means comprises difference circuit means having first and second input terminals respectively connected to said first and second electrode means, and a further terminal providing said output signal.

7. The apparatus claimed in claim 5 wherein said conduit means comprises an elongate endless conduit and wherein said second and third electrode means respectively comprise first and second grids longitudinally spaced in said conduit and disposed adjacent respective opposite sides of said first electrode means.

8. The apparatus claimed in claim 5 wherein said gas is a radioactive gas.

9. Apparatus for use in measuring the angular velocity of an object, comprising:
   a. elongate conduit means forming a closed loop securable to said object for containing a gas;
   b. an ionized gas contained in said conduit means;
   c. voltage supply means for generating a voltage of positive polarity;
   d. first, second, third, fourth and fifth electrode means successively longitudinally disposed in said conduit means, said first and said fifth electrode means being connected to said voltage supply means for receiving said positive polarity voltage therefrom for collecting electrons from said ionized gas, said third electrode means being connected to electrical ground potential; and
   e. difference circuit means connected to said second and fourth electrode means for providing an output signal indicative of ions incident thereon.

* * * * *